Oct. 25, 1927.

W. L. ADAMS 1,647,101

DRAG MECHANISM FOR FISHING REELS

Filed Nov. 14, 1924

INVENTOR.
WALTER L. ADAMS
BY
ATTORNEY.

Patented Oct. 25, 1927.

1,647,101

UNITED STATES PATENT OFFICE.

WALTER L. ADAMS, OF AKRON, OHIO, ASSIGNOR TO THE ENTERPRISE MANUFACTURING COMPANY, OF AKRON, OHIO, A CORPORATION OF OHIO.

DRAG MECHANISM FOR FISHING REELS.

Application filed November 14, 1924. Serial No. 749,874.

The object of the present invention is to improve upon existing forms of drag mechanisms for fishing reels, and to provide a simple and easily assembled device for this purpose which will maintain the drag in proper relation to the spool at all times.

Other objects and advantages will be apparent from the descriptions and drawings forming a part hereof, and will be more particularly pointed out in the appended claims, it being understood that changes and modifications may be made in the construction without departure from the essential features of the invention.

Figure 1:
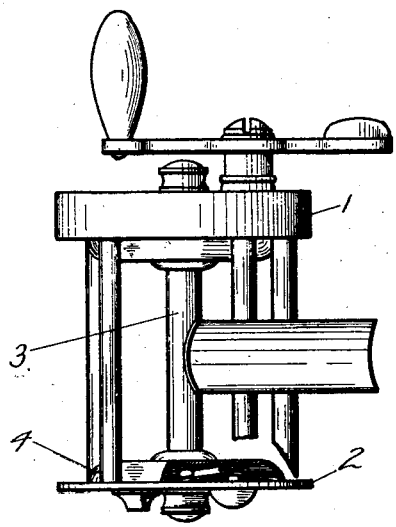
Figure 1 is a side view of a fishing reel equipped with the improved drag mechanism, a part of the spool being broken away to disclose the drag mechanism.
Figure 2:
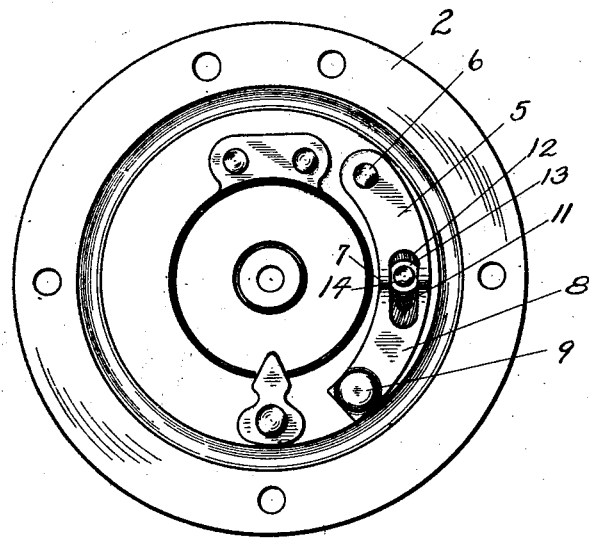
Figure 2 is a plan view of the back plate upon which the drag mechanism is located upon a larger scale than Figure 1.
Figure 3:
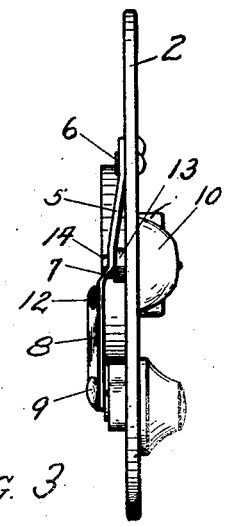
Figure 3 is a side elevation of the back plate.

In the views shown herein, the front plate is indicated by the numeral 1 and the back plate by the numeral 2. The spool is shown at 3, the flange 4 of which is located adjacent the back plate, against which flange the drag mechanism acts.

In the usual form of drag mechanism prior to my invention, use is made of a flat spring bent upwardly so that in its normal position, it bears against the flange and is held away from the flange of the spool by a headed pin or rivet. These pins or rivets tend to break or wear and give trouble, and it is the purpose of the present invention to devise a different form of drag mechanism which will overcome these objectionable features.

In the present invention the drag is in the form of a curved spring metal plate 5 which is attached at one end by a rivet 6, to the back plate beneath the flange of the spool. At a midway point, the plate 5 is bent upwardly to form an inclined surface 7, the plate terminating in a free arm 8 at a higher level than the balance of the plate, the outer end of which carries a knob or button 9, which is designed to bear against the flange of the spool when the drag is on. In the present form of the invention, the spring plate is bent so that it normally lies out of contact with the spool flange, the construction differing in this respect from prior constructions in which the normal position of the spring plate is against the spool flange, and in the present device the operation of the control button is to force the spring plate from its normal position, when the drag is on, rather than to hold it down when the drag is off, as in the prior constructions.

The control button referred to above, is shown at 10, being slidably mounted in a slot 11 in the back plate, below the step or bend 7 in the drag spring. The spring 5 is formed with a slot 12 which extends through the step 7 and to both sides thereof. The button 10 is provided with a collar 13, which is located beneath the drag spring and which, when moved toward the fixed end of the drag spring will elevate the free end of the spring so that the knob 9 will engage the spool flange. When the button 10 is moved toward the free end of the spring, it passes beneath the step 7 and the spring will withdraw to a position out of contact with the spool flange. The button is formed with a projection 14, which is received in the slot 12 previously referred to and serves to maintain the spring plate in proper position, preventing any tendency to rotate about the pivot 6, and thus keeping the spring in proper position with relation to the spool.

It is believed that the operation and advantages of the device will have been clear from the description which has been given. It will be understood, however, that the invention may be embodied in other forms than that illustrated herein and such as fall within the scope of the invention and a fair construction of the appended claim are intended to be covered hereby.

What is claimed is:

In a fishing reel, a back plate, a spool mounted in the reel, the spool having a flange adjacent the back plate, a spring attached to the back plate, the spring being provided with a slot, a button mounted on the back plate and having a shoulder underlying the spring, and a reduced projection entering the slot, the free end of the spring being normally out of engagement with the spool flange but lifted by the shoulder into engagement with the flange upon shifting of the button toward the point of attachment of the spring to the back plate.

WALTER L. ADAMS.